United States Patent
Li et al.

(10) Patent No.: US 11,514,465 B2
(45) Date of Patent: Nov. 29, 2022

(54) METHODS AND APPARATUS TO PERFORM MULTI-LEVEL HIERARCHICAL DEMOGRAPHIC CLASSIFICATION

(71) Applicant: The Nielsen Company (US), LLC, New York, NY (US)

(72) Inventors: Jiabo Li, Syosset, NY (US); Devin T. Jones, New York, NY (US); Kevin Charles Lyons, New York, NY (US)

(73) Assignee: The Nielsen Company (US), LLC, New York, NY (US)

(*) Notice: Subject to any disclaimer, the term of this patent is extended or adjusted under 35 U.S.C. 154(b) by 969 days.

(21) Appl. No.: 15/447,909

(22) Filed: Mar. 2, 2017

(65) Prior Publication Data
US 2018/0253743 A1    Sep. 6, 2018

(51) Int. Cl.
*G06Q 30/02*    (2012.01)
*G06N 3/04*    (2006.01)
*G06N 3/08*    (2006.01)

(52) U.S. Cl.
CPC ........... *G06Q 30/0204* (2013.01); *G06N 3/04* (2013.01); *G06N 3/08* (2013.01)

(58) Field of Classification Search
CPC ......... G06Q 30/0204; G06N 3/04; G06N 3/08
See application file for complete search history.

(56) References Cited

U.S. PATENT DOCUMENTS 9,317,785 B1 * 4/2016 Moon ................ G06K 9/00234
2017/0053077 A1 * 2/2017 Osypka ................ A61B 5/7278
2017/0068887 A1 * 3/2017 Kwon .................... G06N 3/084
2017/0083829 A1 * 3/2017 Kang .................... G06N 3/0454
(Continued)

FOREIGN PATENT DOCUMENTS

CN    105748063    7/2016

OTHER PUBLICATIONS

Girshick, Ross. "Fast r-cnn." Proceedings of the IEEE international conference on computer vision. 2015. (Year: 2015).*

(Continued)

*Primary Examiner* — Li B. Zhen
*Assistant Examiner* — Henry Nguyen
(74) *Attorney, Agent, or Firm* — Hanley, Flight & Zimmerman, LLC

(57) ABSTRACT

Methods and apparatus to perform multi-level hierarchical demographic classification are disclosed. An example apparatus includes a neural network structured to process inputs at an input layer to form first outputs at a first output layer representing first possible classifications of an individual according to a demographic classification system at a first hierarchical level, and to process the first outputs to form second outputs at a second output layer representing possible combined classifications of the individual corresponding to combinations of the first possible classifications and second possible classifications of the individual according to the classification system at a second different hierarchical level; and a selector to select one of the second outputs, and associate with the individual a respective one of the first possible classifications and a respective one of the second possible classifications corresponding to a respective one of the possible combined classifications represented by the selected second output.

19 Claims, 10 Drawing Sheets

(56) References Cited

U.S. PATENT DOCUMENTS

| | | | |
|---|---|---|---|
| 2017/0124415 A1* | 5/2017 | Choi | G06K 9/628 |
| 2017/0262735 A1* | 9/2017 | Ros Sanchez | G06K 9/6256 |
| 2018/0144101 A1* | 5/2018 | Bitran | G06F 19/3418 |

OTHER PUBLICATIONS

El Khiyari, Hachim, and Harry Wechsler. "Face verification subject to varying (age, ethnicity, and gender) demographics using deep learning." Journal of Biometrics and Biostatistics 7.323 (2016): 11. (Year: 2016).*

Dodge et al., "Visual Saliency Prediction Using a Mixture of Deep Neural Networks," arXiv:1702.00372v1 [cs.CV], Feb. 1, 2017, 10 pages.

Goh et al., "Top-Down Regularization of Deep Belief Networks," NIPS Proceedings of the 26th International Confrence on Neural Information Processing Systems, 2013, 9 pages.

Pan et al., "SalGAN: Visual Saliency Prediction with Generative Adversarial Networks," arXiv:1701.01081v2 [cs.CV], Jan. 9, 2017, 10 pages.

Swietojanski, Pawel, "Learning Representations for Speech Recognition using Artificial Neural Networks," Instituted for Language, Cognition and Computation, School of Informatics, University of Edinburgh, 2016, 198 pages.

Wang et al., "Difficulty of selecting among multilevel models using predictive accuracy," Statistics and Its Interface, vol. 7, 2014, 8 pages.

Hu et al., "Learning Structured Inference Neural Networks with Label Relations," arXiv:1511.05616v4 [cs.CV], Nov. 17, 2015, 9 pages.

Morgan, Lucy, "Forecasting in Hierarchical Models," Feb. 20, 2015, 7 pages.

Chou et al., "A Hierarchical Multiple Classifier Learning Algorithm," Pattern Analysis & Applications, Jun. 2003, vol. 6, Issue 2, 4 pages.

Srinivas et al., "Multi-level Classification: A Generic Classification Method for Medical Datasets," IEEE 17th International Conference on E-Health Networking, Application & Services, Oct. 14-17, 2015, 6 pages.

Magdon-Ismail et al., "The Multilevel Classification Problem and a Monotonicity Hint," Intelligent Data Engineering and Automated Learning—IDEAL 2002, vol. 2412, LNCS, Aug. 20, 2002, 6 pages.

Cesa-Bianchi et al., "Incremental Algorithms for Hierarchical Classification," The Journal of Machine Learning Research, vol. 7, Dec. 1, 2006, 8 pages.

Salakhutdinov et al., "Learning with Hierarchical-Deep Models", IEEE Transactions on Pattern Analysis and Machine Intelligence, vol. 35, No. X, 2013, 14 pages.

Wang et al., "Difficulty of selecting among multilevel models using predictive accuracy," Apr. 8, 2014, 15 pages.

* cited by examiner

| | | | |
|---|---|---|---|
| A City Prosperity | A01 | World-Class Wealth | Global high flyers and families of privilege living luxurious lifestyles in London's most exclusive boroughs |
| | A02 | Uptown Elite | High status households owning elegant homes in accessible inner suburbs where they enjoy city life in comfort |
| | A03 | Penthouse Chic | City suits renting premium-priced flats in prestige central locations where they work hard and play hard |
| | A04 | Metro High-Flyers | Ambitious 20 and 30-somethings renting expensive apartments in highly commutable areas of major cities |
| B Prestige Positions | B05 | Premium Fortunes | Influential families with substantial income established in distinctive, expansive homes in wealthy enclaves |
| | B06 | Diamond Days | Retired residents in sizeable homes whose finances are secured by significant assets and generous pensions |
| | B07 | Alpha Families | High-achieving families living fast-track lives, advancing careers, finances and their school-age kids' development |
| | B08 | Bank of Mum and Dad | Well-off families in upmarket suburban homes where grown-up children benefit from continued financial support |
| | B09 | Empty-Nest Adventure | Mature couples in comfortable detached houses who have the means to enjoy their empty-nest status |
| C Country Living | C10 | Wealthy Landowners | Prosperous owners of country houses including the rural upper class, successful farmers and second-home owners |
| | C11 | Rural Vogue | Country-loving families pursuing a rural idyll in comfortable village homes while commuting some distance to work |
| | C12 | Scattered Homesteads | Older households appreciating rural calm in stand-alone houses within agricultural landscapes |
| | C13 | Village Retirement | Retirees enjoying pleasant village locations with amenities to service their social and practical needs |

FIG. 6A

| | | | |
|---|---|---|---|
| D | D16 | Sunrise Subburbs | Mature households living in expanding developments around larger villages with good transport links |
| | D15 | Local Focus | Rural families in affordable village homes who are reliant on the local economy for jobs |
| | D17 | Outlying Seniors | Pensioners living in inexpensive housing in out of the way locations |
| | D17 | Far-Flung Outposts | Mid-income families in remote areas with long travel times to larger towns |
| E | E20 | Golden Retirement | Time-honoured elders now mostly living alone in comfortable suburban homes on final salary pensions |
| | E19 | Bungalow Haven | Peace-seeking seniors appreciating the calm of bungalow estates designed for the elderly |
| | E18 | Classic Grandparents | Lifelong couples in standard suburban homes enjoying retirement through grandchildren and gardening |
| | E21 | Solo Retirees | Senior singles whose reduced incomes are satisfactory in their affordable but pleasant owned homes |
| F | F22 | Boomerang Boarders | Long-term couples with mid-range incomes whose adult children have returned to the shelter of the family home |
| | F23 | Family Ties | Active families with teens and adult children whose prolonged support is eating up household resources |
| | F24 | Fledgling Free | Pre-retirement couples with respectable incomes enjoying greater space and spare cash since children left home |
| | F25 | Dependable Me | Single mature owners settled in traditional suburban semis working in intermediate occupations |

FIG. 6B

| | | | |
|---|---|---|---|
| G | G26 | Cities and Cosmopolitans | Affluent families with growing children living in upmarket housing in city environs |
| | G27 | Thriving Independence | Well-qualified older singles with incomes from successful professional careers in good quality housing |
| | G28 | Modern Parents | Busy couples in modern detached homes juggling the demands of school-age children and careers |
| | G29 | Mid-Career Convention | Professional families with children in traditional mid-range suburbs where neighbours are often older |
| H | H30 | | Forward-thinking younger families who sought affordable homes in good suburbs which they may now be out-growing |
| | H31 | | Settled families with children owning modest, 3-bed semis in areas where there's more house for less money |
| | H32 | | Pre-family newcomers who have bought value homes with space to grow in affordable but pleasant areas |
| | H33 | | Fashion-conscious young singles and partners setting up home in developments attractive to their peers |
| | H34 | | Occupants of brand new homes who are often younger singles or couples with children |
| | H35 | | Bright young singles on starter salaries choosing to rent homes in family suburbs |
| I Family Basics | I36 | Solid Economy | Stable families with children renting better quality homes from social landlords |
| | I37 | Budget Generations | Families supporting both adult and younger children where expenditure can exceed income |
| | I38 | Childcare Squeeze | Younger families with children who own a budget home and are striving to cover all expenses |
| | I39 | Families with Needs | Families with many children living in areas of high deprivation and who need support |

FIG. 6C

| | | | |
|---|---|---|---|
| J Transient Renters | J40 | Make Do & Move On | Yet to settle younger singles and couples making interim homes in low cost properties |
| | J41 | Disconnected Youth | Young people endeavouring to gain employment footholds while renting cheap flats and terraces |
| | J42 | Streetwise Strain Younger | Younger hard-pressed singles in social housing with financial challenges |
| | J43 | Renting a Room | Transient renters of low cost accommodation often within subdivided older properties |
| K Municipal Challenge | K44 | Inner City Stalwarts | Long-term renters of inner city social flats who have witnessed many changes |
| | K45 | Crowded Kaleidoscope | Multi-cultural households with children renting social flats in over-crowded conditions |
| | K46 | High Rise Residents | Renters of social flats in high rise blocks where levels of need are significant |
| | K47 | Streetwise Singles | Hard-pressed singles in low cost social flats searching for opportunities |
| | K48 | Low Income Workers | Older social renters settled in low value homes in communities where employment is harder to find |
| L Vintage Value | L49 | Dependent Greys | Ageing social renters with high levels of need in centrally located developments of small units |
| | L50 | Pocket Pensions | Penny-wise elderly singles renting in developments of compact social homes |
| | L51 | Aided Elderly | Supported elders in specialised accommodation including retirement homes and complexes of small homes |
| | L52 | Estate Veterans | Long-standing elderly renters of social homes who have seen neighbours change to a mix of owners and renters |
| | L53 | Seasoned Survivors | Deep-rooted single elderly owners of low value properties whose modest home equity provides some security |

METHODS AND APPARATUS TO PERFORM MULTI-LEVEL HIERARCHICAL DEMOGRAPHIC CLASSIFICATION

FIELD OF THE DISCLOSURE

The present disclosure relates generally to demographic classification and, more particularly, to methods and apparatus to perform multi-level hierarchical demographic classification.

BACKGROUND

Traditionally, audience measurement entities (AMEs) perform, for example, audience measurement and categorization, measurement of advertisement impressions, measurement of exposures to media, etc., link such measurement information with demographic information.

BRIEF DESCRIPTION OF THE DRAWINGS

Figure 6E:
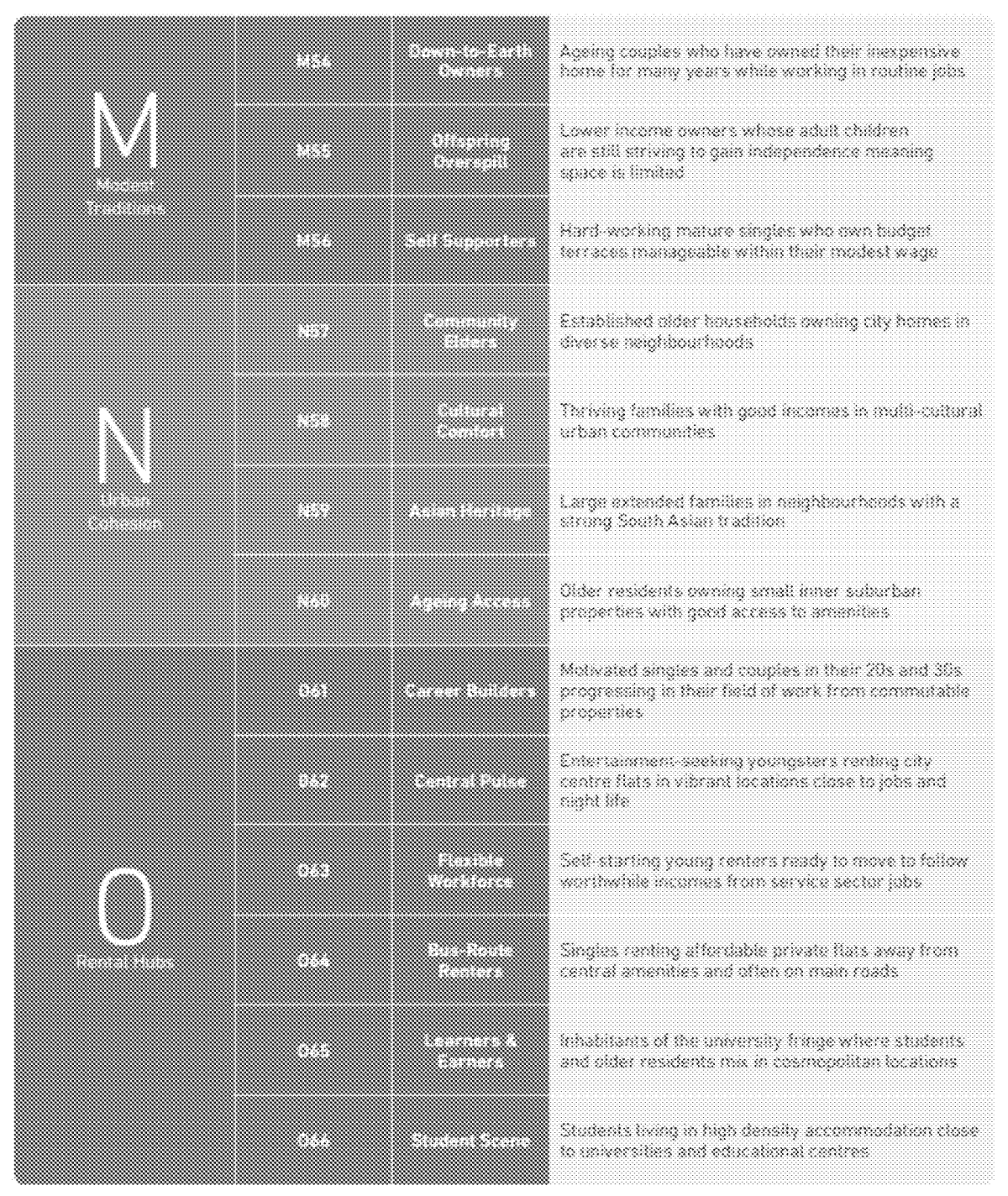

FIGS. 6A, 6B, 6C, 6D and 6E are tables representing a multi-level classification system.

DETAILED DESCRIPTION

Figure 1:
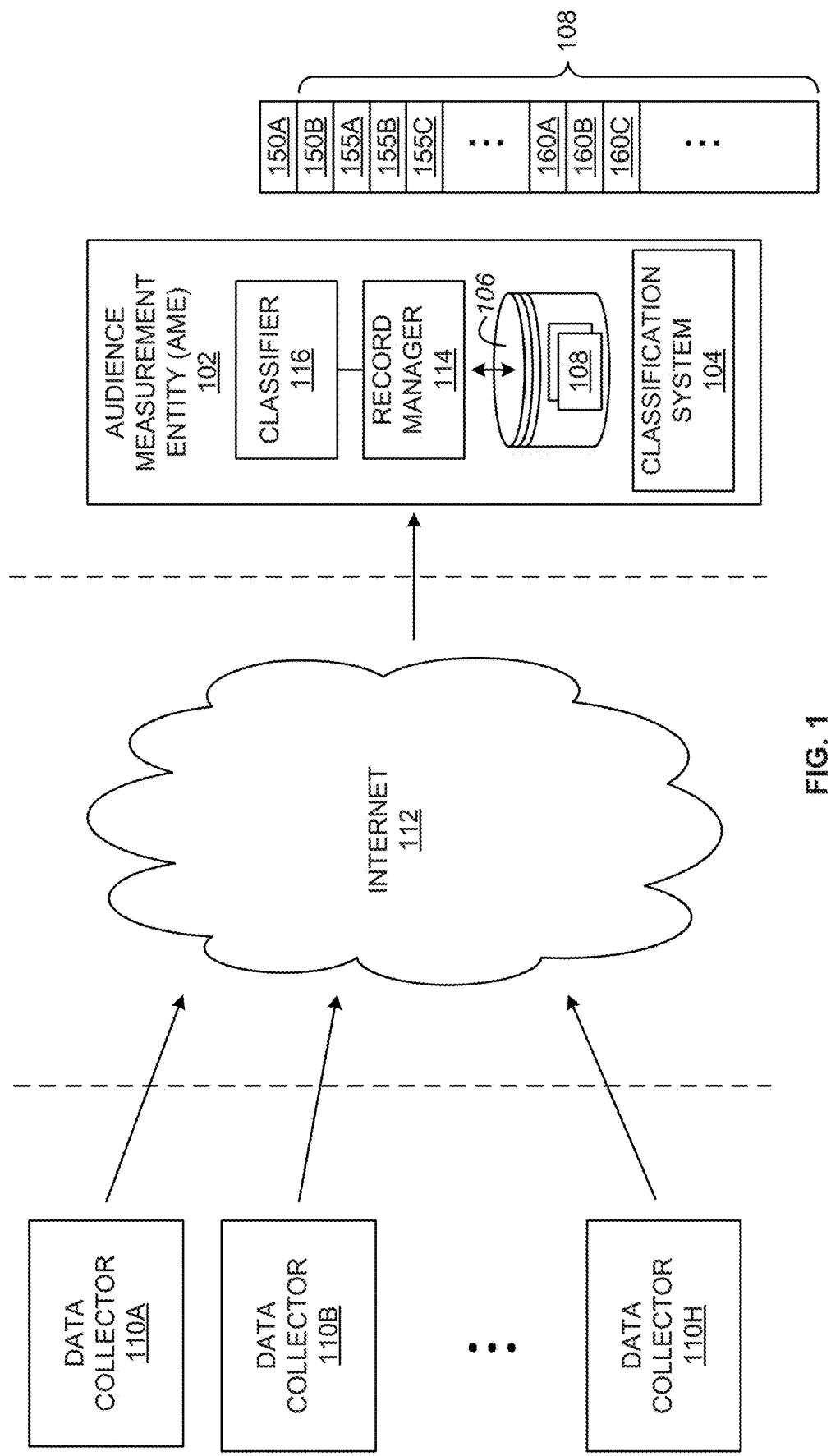
FIG. 1 illustrates an example environment in which information representing demographic characteristics may be collected and multi-level hierarchical demographic classification performed.

Methods and apparatus to perform multi-level hierarchical demographic classification are disclosed. An example apparatus to demographically classify an individual includes a querier to provide inputs based on demographic information for the individual; a neural network structured to have an input layer, a first output layer, and a second output layer subsequent to the first output layer, the neural network structured to process the inputs presented at the input layer to form first outputs at the first output layer, the first outputs representing first possible classifications of the individual according to a demographic classification system at a first hierarchical level, and process the first outputs to form second outputs at the second output layer, the second outputs representing possible combined classifications of the individual, the possible combined classification corresponding to combinations of the first possible classifications and second possible classifications of the individual according to the demographic classification system at a second hierarchical level different from the first hierarchical level; and a selector to select one of the second outputs at the second output layer, and associate with the individual a respective one of the first possible classifications and a respective one of the second possible classifications corresponding to a respective one of the possible combined classifications represented by the selected second output.

An example method of performing demographic classification of an individual includes obtaining data representative of demographic characteristics of an individual; processing the data with a neural network to form first outputs at a first output layer of the neural network, the first outputs representing first possible demographic classifications of the individual at a first hierarchical classification level; and processing the first outputs with the neural network to form second outputs at a second output layer of the neural network, the second outputs representing possible combined demographic classifications of the individual at combinations of the first possible demographic classifications and second possible demographic classifications, and the second possible demographic classifications at a second hierarchical classification level different from the first hierarchical classification level.

An tangible computer-readable storage medium includes instructions that, when executed, cause a machine to obtain data representative of demographic characteristics of an individual; process the data with a neural network to form first outputs at a first output layer of the neural network, the first outputs representing first possible demographic classifications of the individual at a first hierarchical classification level; and process the first outputs with the neural network to form second outputs at a second output layer of the neural network, the second outputs representing possible combined demographic classifications of the individual at combinations of the first possible demographic classifications and second possible demographic classifications, and the second possible demographic classifications at a second hierarchical classification level different from the first hierarchical classification level.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Audience measurement entities (AMEs), such as The Nielsen Company, LLC (the assignee of the present application) and/or other businesses, often desire to link demographics with information representing, for example, exposure to advertisements, media, etc. In this way, AMEs can, for example, determine the effectiveness of an advertising campaign, determine products of interest to particular demographic categories, etc. In some examples, AMEs engage a panel of persons who have agreed to provide their demographic information and to have their activities monitored. When a panelist joins the panel, they provide detailed information concerning their identity and demographics (e.g., gender, age, ethnicity, income, home location, occupation, etc.). Additional demographic information may be collected as the panelist is monitored, and/or may be obtained from third parties. Such information can be obtained using methods that preserve the privacy of the panelist. Example panelists include, but are not limited to, individuals, groups of persons, households, neighborhoods, etc. For clarity of explanation, the disclosed examples will be described with reference to demographic classification of individuals, but this disclosure may be used to perform classification for any other type of panelist.

Given the large quantities of information, multi-level classification systems have evolved to classify individuals into categories, segments, groups, etc. based on demographic information or characteristics. An example multi-level classification system is Experian's Mosaic® UK segmentation system shown in FIGS. 6A-6E. Experian's Mosaic UK segmentation system classifies households and neighborhoods into 66 segments and 15 categories. The Mosaic UK segmentation system is multi-level and hierarchical. It assigns a household to a category (e.g., one of City Prosperity, Country Living, etc.), and assigns the household to a segment within the assigned category (e.g., Uptown Elite within the category of City Prosperity).

Given the vast amount of data currently accessible via the Internet, tens of thousands of pieces of information may be known or ascertained about an individual. The available information about an individual continues to increase on a daily basis. It is clear that the Internet has created circumstances in which it is infeasible, if not impossible, to manually or mentally classify an individual demographically according to a multi-level hierarchical arrangement of categories, segments, groups, etc. It is likewise infeasible, if not impossible, for someone to manually or mentally create a set of rules or logic that a processor can carry out to correctly classify an individual demographically according to a multi-level hierarchical arrangement of categories, segments, groups, etc. While the Internet has made available huge amounts of information on individuals, no methods or apparatus exist to process such huge amounts of data to properly classify an individual demographically according to a multi-level hierarchical arrangement of categories, segments, groups, etc. Example methods and apparatus disclosed herein utilize a deep neural network implementing residual learning to overcome at least these problems.

Prior methods and apparatus also fail to properly address multi-level hierarchical classification. For example, when an individual is to be classified into a category, and also into a segment within the category, etc., prior solutions make such category and segment classifications independently. In contrast, the example methods and apparatus disclosed herein perform the category and segment classifications in combination, thereby improving overall classification accuracy. Example disclosed methods and apparatus include a neural network having multiple output layers (one for each hierarchical layer of the multi-level classification system), and a loss function used in training the neural network that includes contributions from the multiple hierarchical output layers. In this way, inter-relatedness between classifications for different levels of the hierarchical classification system is explicitly included in classification decisions. For example, an individual will not be classified into a segment that does not belong with the category into which the individual is classified.

For simplicity, reference will be made herein to performing classification based on a two-level hierarchical demographic classification system. A non-limiting example of a two-level hierarchical demographic classification system is Experian's Mosaic UK segmentation system discussed above and shown in FIGS. 6A-6E. However, the example methods and apparatus disclosed herein may be used to perform multi-level hierarchical demographic classification using classifications having other depths (e.g., more than two layers) and/or breadth (e.g., other numbers of categories and/or segments). Further, the examples disclosed herein may be used to perform multi-level hierarchical classification for other purposes such as, but not limited to, audience measurement, market research, medical research, municipal planning, product development, biological studies, taxonomy, epidemiological research, etc.

FIG. 1 illustrates an example system 100 having an AME 102 that, among other things, classifies individuals with an example multi-level hierarchical demographic classification system 104. In some examples, the classification system 104 is a two-level hierarchical demographic classification system defined by a data structure (e.g., a table such as that shown in FIGS. 6A-6E). In the example of FIGS. 6A-6E, an individual is classified into one of the categories (e.g., category A—City Prosperity) shown in the first column, and also into a segment (e.g., one of A01, A02, A03 and A04 when A is the selected category) in the second column.

To store demographic information, identity information, etc., associated with individuals, the example AME 102 includes an example database 106. In the example of FIG. 1, information is stored in the database 106 using a record 108 for each individual having information in the database 106. As shown, each record 108 has a plurality of example fields 150A, 150B, 155A, 155B, 155C, . . . , 160A, 160B, 160C, . . . The fields 150A, 150B, 155A, 155B, 155C, . . . , 160A, 160B, 160C, . . . may store information in a variety of forms. For example, free form information, value of a variable information, item selected from a list, a check box state, etc. Information may be stored in the database 106 using any number and/or type(s) of data structure(s). The database 106 may be implemented using any number and/or type(s) of computer-readable storage mediums. The number and/or type(s) of information stored in one record 108 need not be the same number and/or type(s) of information stored in another record 108. For example, a free form field may record that a first individual has a horse named Daisy, while that same free form field in another record is used to record that a second individual goes sky diving at Jumping Joes. Demographic classifications previous made or obtained for an individual may also be included in their record 108 and used during subsequent demographic classifications.

The information stored in a record 108 may be received (e.g., obtained) by the AME 102, and/or may be received (e.g., obtained) from one or more data example collectors 110A, 110B . . . 110H. In the example of FIG. 1, the information is received from the one or more data collectors 110A, 110B . . . 110H via the Internet 112, although other methods of receiving information may be used. The information stored in a record 108 may have been obtained by different ones of the AME 102 and the data collectors 110A, 110B . . . 110H, at the same or different times. Further, the information stored in a record 108 may be changed (e.g., augmented, updated, replaced, removed, etc.) over time by any or all of the AME 102 and the data collectors 110A, 110B . . . 110H. The data collectors 110A, 110B . . . 110H may be, for instance, other AMEs, content publishers, advertisers, third parties, etc. who collect demographic and identity information, etc.

To manage the records 108 stored in the database 106, the example AME 102 includes an example record manager 114. The record manager 114 receives information and changes from the AME 102 and/or the data collectors 110A, 110B . . . 110H for an individual, and updates the individual's record 108 based on the information and changes. The record manager 114 also implements an application programming interface (API) that enables the retrieval of all of, or particular portion(s) of a record 108 for an individual.

To demographically classify an individual according to the example multi-level hierarchical classification system 104, the example AME 102 includes an example classifier 116. As disclosed below in more detail in connection with FIGS. 2 and 3, the example classifier of FIG. 1 processes a record 108 for an individual to form a multi-level hierarchical demographic classification for the individual. The record 108 can be updated with the determined classification, or, for example, the determined classification may be used otherwise by the AME 102, or another entity.

Figure 2:
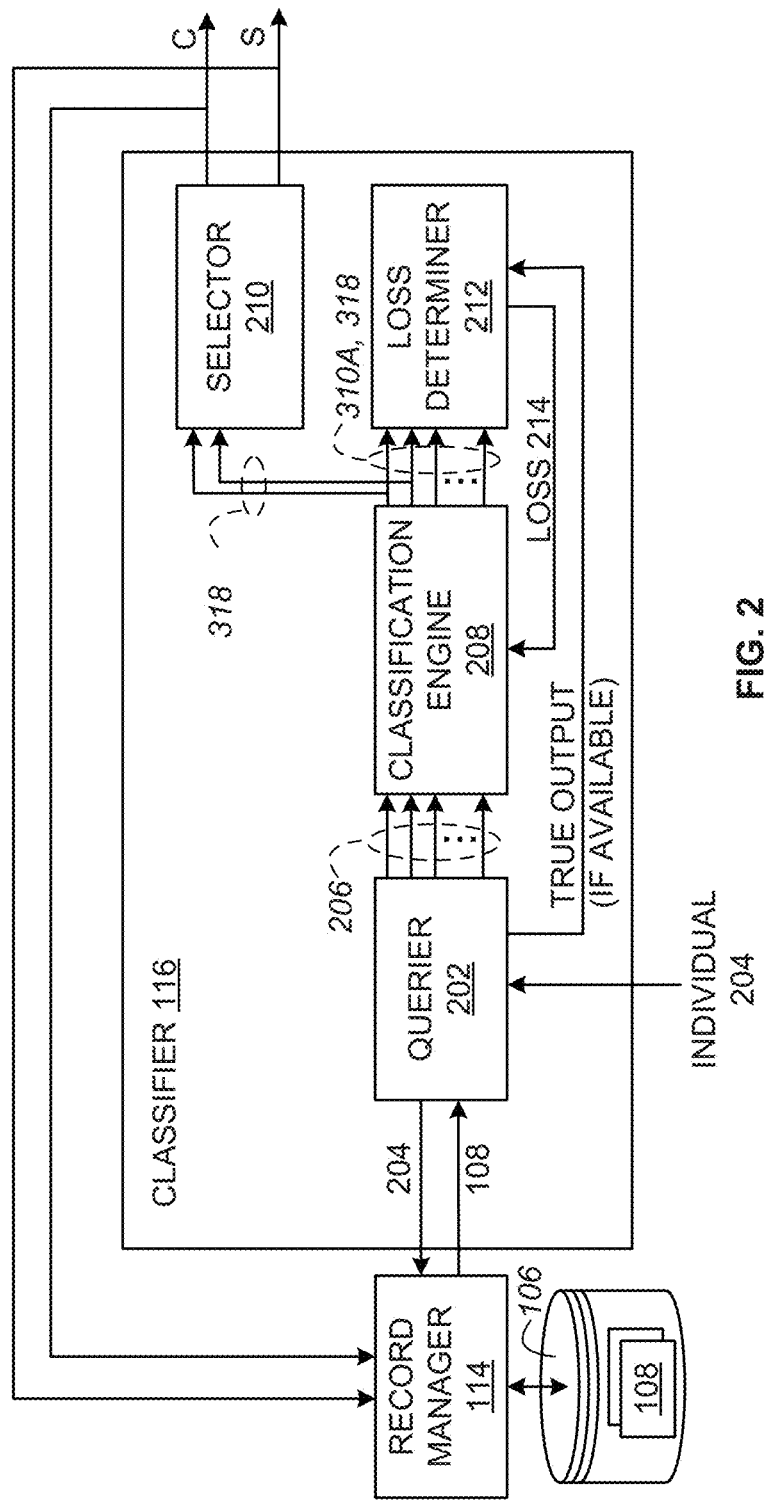
FIG. 2 is a block diagram illustrating an example implementation for the classifier of FIG. 1.

Turning to FIG. 2, an example implementation of the example classifier 116 of FIG. 1 is shown. In the example of FIG. 2, the classifier 116 classifies an individual 204 into a demographic category C, and a demographic segment S of the demographic category C, where the categories and segments are arranged hierarchically. In the case of a three-level classification, the individual 204 may, for instance, additionally be classified into a demographic sub-segment SS of the demographic segment S. It should be clear in view of the following that classifications may be made based on any number of hierarchical levels having any number of possible classifications per level using the examples found in this disclosure.

To obtain a record 108 for processing, the example classifier 116 of FIG. 2 includes an example querier 202. For an indicated individual 204, the example querier 202 of FIG. 2 requests the respective record 108 for the individual 204 from the record manager 114. The example querier 202 forms example inputs 206 for an example classification engine 208 from the obtained record 108. The example inputs 206 of FIG. 2 have a consistent format, meaning and content based on the implementation of the classification engine 208. The format, meaning and content of the inputs 206 are selected to represent the particular information from which demographic classifications are to be made by the classification engine 208. In some examples, the first of the inputs 206 is age in decimal, the second is zip code in decimal, the third is marriage status as one of four values representing married, divorced, widowed and single, etc. As discussed above, information in the record 108 need not have a consistent format, meaning and content. Thus, while the inputs 206 may be the same as the contents of the record 108, they may be different. The example querier 202 uses any number and/or type(s) of methods, conversions, formatting, etc. to provide as many of the inputs 206 as possible given the contents of the record 108. For example, the record 108 may list the size of the individual's house as 3217 square feet, but be reflected in the inputs 206 as being a house between 3000 and 3500 square feet. In some examples, the record 108 may not contain information related to all of the inputs 206, in which case they may be left blank or empty. In some examples, not all the information in the record 108 is converted for use as an input 206.

Figure 3:
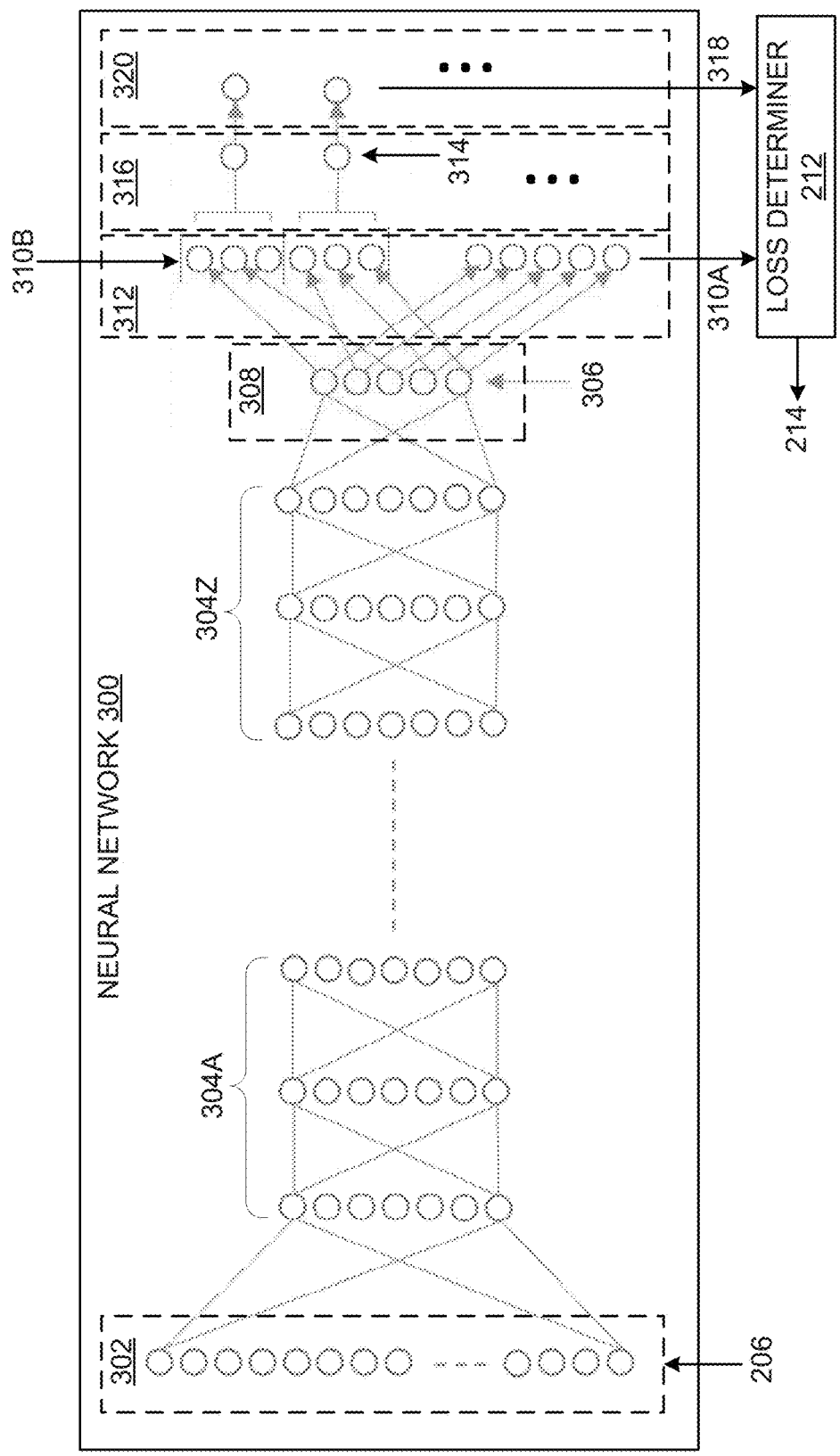
FIG. 3 is a block diagram illustrating an example implementation for the example classification engine of FIG. 2.

To determine information from which multi-level hierarchical demographic classifications can be made, the example classifier 116 includes the example classification engine 208. An example implementation of the classification engine 208 in the form of an example neural network 300 is shown in FIG. 3. In general, a neural network is a fully or partially interconnected two-dimensional (2D) or three-dimensional (3D) network or mesh of nodes. The connections between nodes have associated coefficients that represent the influence that the signal output of one node has on another. Typically, the coefficients are trained or learned during a training or learning phase. For examples, the coefficients may be trained using known input/output combinations, or may be training using only inputs.

In the example of FIG. 3, the neural network 300 includes an example input layer 302 to receive the inputs 206 from the querier 202, and a plurality of example neural network modules 304A . . . 304Z. In some examples, each of the inputs 206 provides an input value for all of the neural network nodes (shown as circles in FIG. 3) that form the input layer 302. In some examples, the neural network modules 304A . . . 304Z are hidden, three-layer, fully-connected neural networks. In some instances, the neural network modules 304A . . . 304Z are residual neural network modules, and inputs and outputs of the neural network module 304A . . . 304Z are connected to provide residual learning, thereby improve learning performance when the neural network 300 is large and/or deep. In the illustrated example, each of the inputs 206 is coupled to each of the inputs of the first neural network module 304A . . . 304Z, and each neural network module 304A . . . 304Z is fully interconnected with its preceding and following neural network modules 304A . . . 304Z. The input layer 302 and the neural network modules 304A . . . 304Z may be implemented using any appropriate neural network architecture. Other neural network topologies and/or dimensions may be used based on characteristics of the inputs, classifications to be made, etc.

Starting from the inputs 206, the example input layer 302 and the example neural network modules 304A . . . 304Z form a set of examples signals 306 at an example segment output layer 308 of neural nodes (shown as circles in FIG. 3). Each of the signals 306 and its corresponding node has a one-to-one correspondence with one of the possible segment classifications from which the segment S is selected. The possible segment classifications are associated with classification of the entity at a first (e.g., segment) level of the multi-level hierarchical classification system. For example, if there are forty-seven possible segment classifications, then there are forty-seven signals 306. The value of a signal 306 represents how strongly the neural network 300 indicates the individual 204 should be classified into the segment corresponding to the signal 306.

To form example output signals 310A at an example sorting output layer 312, the example neural network 300 of FIG. 3 performs an example "softmax" operation on the signals 306. There is a one-to-one correspondence between the signals 306 and the signals 310A. The softmax operation converts the signals 306 to the signals 310A as probabilities (e.g., between 0 and 1) that the individual 204 should be classified with the segment corresponding to the value 310A. An example softmax operation forms the example signals 310A by modifying the signals 306 to each have a value in the range of zero to one, where the sum of the modified values is one. An example softmax operation may be expressed mathematically as:

$$p_j = \frac{e^{v_j}}{\sum_i e^{v_i}}$$

where $v_j$ are the signals 306, and $p_j$ are the signals 310A. To form example output signals 310B at the example sorting layer 312, the example neural network 300 sorts the signals 306 to form the signals 310B so the signals 310B corresponding to segments associated with the same category are adjacent.

To form output signals 314 at an example combining output layer 316, the example neural network 300 of FIG. 3 performs an example "max pooling" operation on the signals 310B. Within each category, max pooling selects one of the signals 310B associated with the category that has the highest probability that classification with that segment for that category is correct, given that category is selected. The selected signals 310B for each category form example signals 314. Each of the signals 314 corresponds to a particular, valid and possible category/segment combination classification. The combination is valid and possible in that the combination is present in the multi-level classification system 104. The possible combination classifications represent a combination of a possible segment classification (at the segment or 1st level of the hierarchical classification) and a possible category classification (at the category or $2^{nd}$ level of the hierarchical classification). By forming signals 314 that represent only valid possible combinations of category and segment, the examples disclosed herein can ensure consistency of the resultant classification across the levels of a multi-level classification system. For example, an individual cannot be classified with a segment that does not belong with the category to which they are classified. Moreover, by making concurrent category and segment classifications, the overall classification is more likely to correct, as compared to independent classification decisions.

To form example output signals 318 at an example probability computing output layer 320, the example neural network 300 performs the softmax operation to convert the signals 314 into signals 318 that represent the probability (e.g., between 0 and 1) that classification with the category and segment combination associated with a signal 318 is correct. Each of the probability signals 318 corresponds to a particular category/segment combination. In some examples, the signal 318 representing the highest probability is selected, and the individual 204 is classified with the corresponding category/segment combination. When, for example, three-level hierarchical classification is implemented, sorting can be added to output layer 320, and additional combining and probability computing output layers added following the layer 320. The additional probabilities represent the probabilities that a particular combination of category/segment/sub-segment is the correct classification.

Returning to FIG. 2, to classify the individual 204, the example classifier 116 includes an example selector 210. The example selector 210 of FIG. 2 selects the signal 318 output by the classification engine 208 representing the highest probability. In the example of FIG. 3, the signals 318 are associated with the final output layer 320 of the neural network 300. Each of the signals 318 represents the probability that selection of a respective category/segment combination is correct. In some examples, the selector 210 classifies the individual 204 with the category/combination associated with the signal 318 representing the highest probability. In other examples, other decision criteria may be used. For example, others of the signals 306, 310A, 314 and/or 318 may considered and/or combined to select a category/segment combination.

To train and/or update the classification engine 208, the example classifier 116 of FIG. 2 includes an example loss determiner 212. The example loss determiner 212 of FIG. 2 computes an example loss value 214 that represents the errors reflected in the output signals 310A and the output signals 318. The loss value 214 is provided to the classification engine 208. The classification engine 208 updates its coefficients based on the loss 214. In some examples, the classification engine 208 uses a stochastic gradient descent algorithm or method to update the coefficients to reduce the loss 214. An example loss function includes contributions from the segments as reflected in the signals 310A, contributions from the categories as reflected in the signals 318, and contributions from a normalization term. The normalization term is included to reduce the likelihood that the classification engine 208 learns incorrect coefficients, sometimes referred to statistically as overfitting, because of the complexity of the classification problem and/or the classification engine 208. In some examples, the contributions from the segments and the categories are expressed as cross-entropies. In some examples, the contributions are combined as a weighted sum of the contributions. An example loss function can be expressed mathematically as:

$$\text{loss}(x) = -w_1 \sum_{i=1}^{N} \sum_{j=1}^{M} S_j^i \log(\hat{S}_j^i(x)) - w_2 \sum_{i=1}^{N} \sum_{j=1}^{L} C_j^i \log(\hat{C}_j^i(x)) + w_3 L_1(x)$$

where x denotes the coefficients of the classification engine 208, N is the number of records 108, each record corresponding to one person (audience, in advertisement), M is the number of possible segments, L is the number of possible categories, $S_j^i$ are one-hot coded segment labels having a value of one (if the individual belongs to segment j) or zero (if not), $\hat{S}_h^i$ is the predicted probability of segment j (e.g., one of the signals 310A), $C_j^i$ are one-hot coded category labels having a value of one (if the individual belongs to category j) or zero (if not), and $\hat{C}_j^i$ is the probability of category j (e.g., the signals 318), and the function $L_1$ (x) is the L1 regularization of x. The weight factors, $w_1$, $w_2$ and $w_3$, allow the relative importance of the three terms to be adjusted. In some examples, they all have a value of one. In some examples, the weight factors, $w_1$, $w_2$ and $w_3$, can be adaptively adjusted as the classification engine 208 is trained. Other suitable loss functions may be used. For example, if three-level hierarchical classification is implemented, another cross-entropy term may be added.

While example implementations of the example classifier 116, the example querier 202, the example classification engine 208, the example selector 210, the example loss determiner 212, the example neural network 300, the example neural network layers 302, 308, 312, 316 and 320, and the example neural network modules 304A . . . 304Z are shown in FIGS. 2 and 3, one or more of the elements, processes and/or devices illustrated in FIGS. 2 and 3 may be combined, divided, re-arranged, omitted, eliminated and/or implemented in any other way. Further, the example classifier 116, the example querier 202, the example classification engine 208, the example selector 210, the example loss determiner 212, the example neural network 300, the example neural network layers 302, 308, 312, 316 and 320, and the example neural network modules 304A . . . 304Z of FIGS. 2 and 3 may be implemented by hardware, software, firmware and/or any combination of hardware, software, and/or firmware. Thus, for example, any of the example classifier 116, the example querier 202, the example classification engine 208, the example selector 210, the example loss determiner 212, the example neural network 300, the example neural network layers 302, 308, 312, 316 and 320, and the example neural network modules 304A . . . 304Z could be implemented by one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example classifier 116, the example querier 202, the example classification engine 208, the example selector 210, the example loss determiner 212, the example neural network 300, the example neural network layers 302, 308, 312, 316 and 320, and the example neural network modules 304A . . . 304Z is/are hereby expressly defined to include a tangible computer-readable storage medium storing the software and/or firmware. Further still, the example classifier 116, the example querier 202, the example classification engine 208, the example selector 210, the example loss determiner 212, the example neural network 300, the example neural network layers 302, 308, 312, 316 and 320, and the example neural network modules 304A . . . 304Z of FIGS. 2 and 3 may include one or more elements, processes and/or devices in addition to, or instead of, those illustrated in FIGS. 2 and 3, and/or may include more than one of any or all of the illustrated elements, processes and devices.

Figure 4:
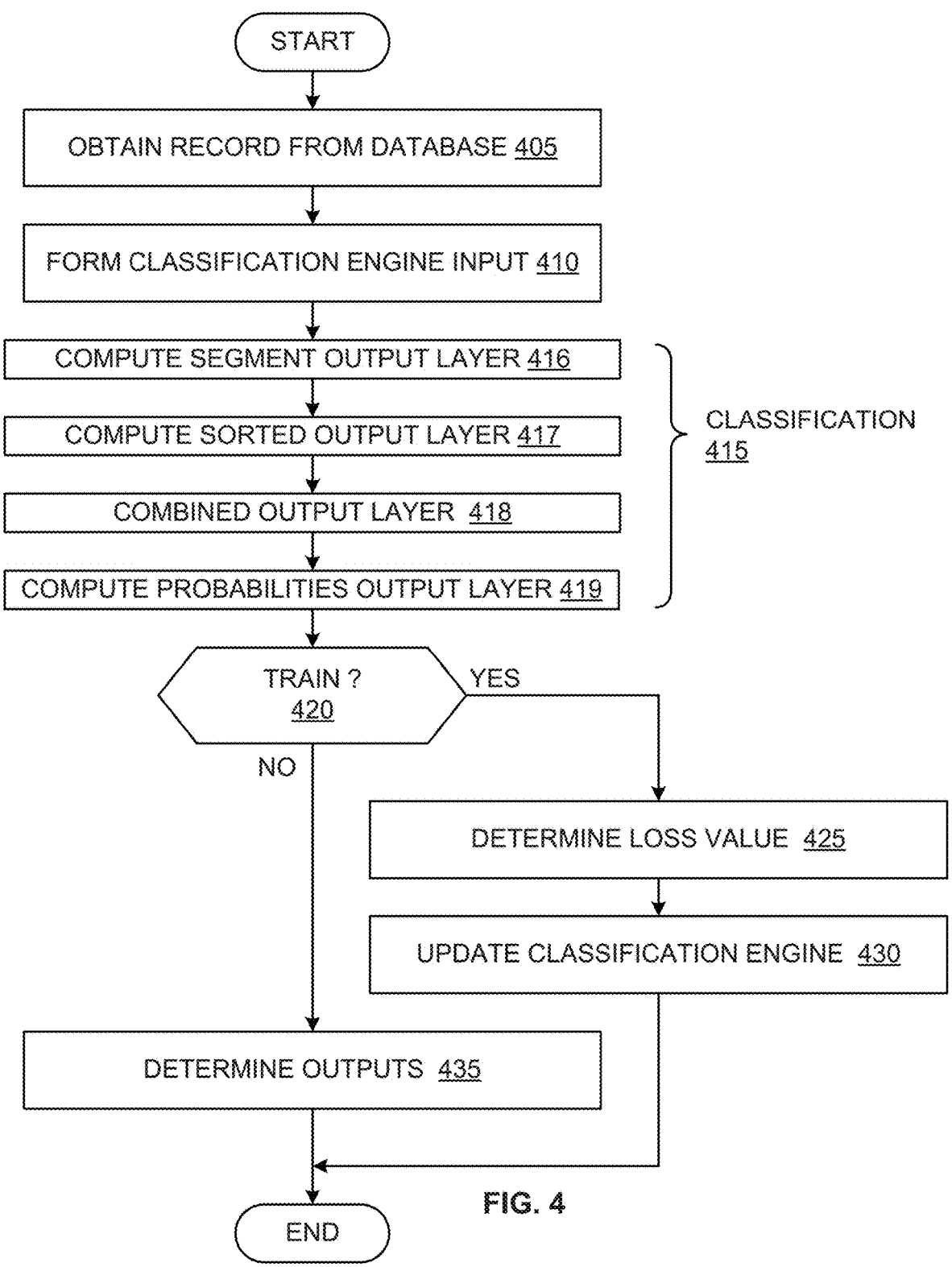
FIG. 4 is a flow diagram representing example processes that may be implemented as machine-readable instructions that may be executed to implement the example classifier of FIGS. 1 and 2 to perform multi-level hierarchical demographic classification.

FIG. 4 is a flow diagram representative of example process(es) that may be implemented as coded computer-readable instructions, the coded instructions may be executed to implement the classifier 116 of FIGS. 1 and 2 to perform multi-level hierarchical demographic classification. In this example, the coded instructions comprise one or more programs for execution by a processor such as the processor 512 shown in the example processor platform 500 discussed below in connection with FIG. 5. The program(s) may be embodied in the coded instructions and stored on one or more tangible computer-readable storage mediums associated with the processor 412. One or more of the program(s) and/or parts thereof could alternatively be executed by a device other than the processor 512. One or more of the programs may be embodied in firmware or dedicated hardware. Further, although the example process(es) is/are described with reference to the flowchart illustrated in FIG. 4, many other methods of implementing the example classifier 116 may alternatively be used. For example, the order of execution of the blocks may be changed, and/or some of the blocks described may be changed, eliminated, or combined.

As mentioned above, the example process(es) of FIG. 4 may be implemented using coded instructions (e.g., computer-readable instructions and/or machine-readable instructions) stored on one or more tangible computer-readable storage mediums. As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally, or alternatively, the example process(es) of FIG. 4 may be implemented using coded instructions (e.g., computer-readable instructions and/or machine-readable instructions) stored on one or more non-transitory computer mediums. As used herein, the term non-transitory computer-readable storage medium is expressly defined to include any type of computer-readable storage device and/or storage disk and to exclude propagating signals and to exclude transmission media. As used herein, "non-transitory computer-readable storage medium" and "non-transitory machine-readable storage medium" are used interchangeably.

Example tangible computer-readable storage mediums include, but are not limited to, any tangible computer-readable storage device or tangible computer-readable storage disk such as a memory associated with a processor, a memory device, a flash drive, a digital versatile disk (DVD), a compact disc (CD), a Blu-ray disk, a floppy disk, a hard disk drive, a random access memory (RAM), a read-only memory (ROM), etc. and/or any other storage device or storage disk in which information is stored for any duration (e.g., for extended time periods, permanently, for brief instances, for temporarily buffering, and/or for caching of the information).

The example process of FIG. 4 includes the example querier 104 obtaining a record 108 for an individual 204 from the example database 104 (block 405), and forming the inputs 206 for the example classification engine 208 (block 410). At block 415, the example classification engine 208 processes the inputs 206 to form the signals 306 for respective segments at the example segment output layer 308 (block 416), forms the signals 310A and 310B at the example sorted output layer 312 (block 417), forms the signals 314 at the example combining output layer 316 (block 418), and forms the signals 318 at the example probabilities output layer 320 (block 419).

If the classification engine 208 is being trained (block 420), the example loss determiner 212 computes a loss value 214 using, for example, the equation disclosed herein (block 425). The loss value 214 is fed back to the classification engine 208, which updates its coefficients based on the loss value 214 (block 430). Control then exits from the example process of FIG. 4.

Returning to block 420, if the classification engine 208 is not being trained (block 420), the example selector 210 selects a category/segment combination for the user 204 based on the output signals 318 at the probabilities output layer 320 (block 435), and control exits from the example process of FIG. 4.

Figure 5:
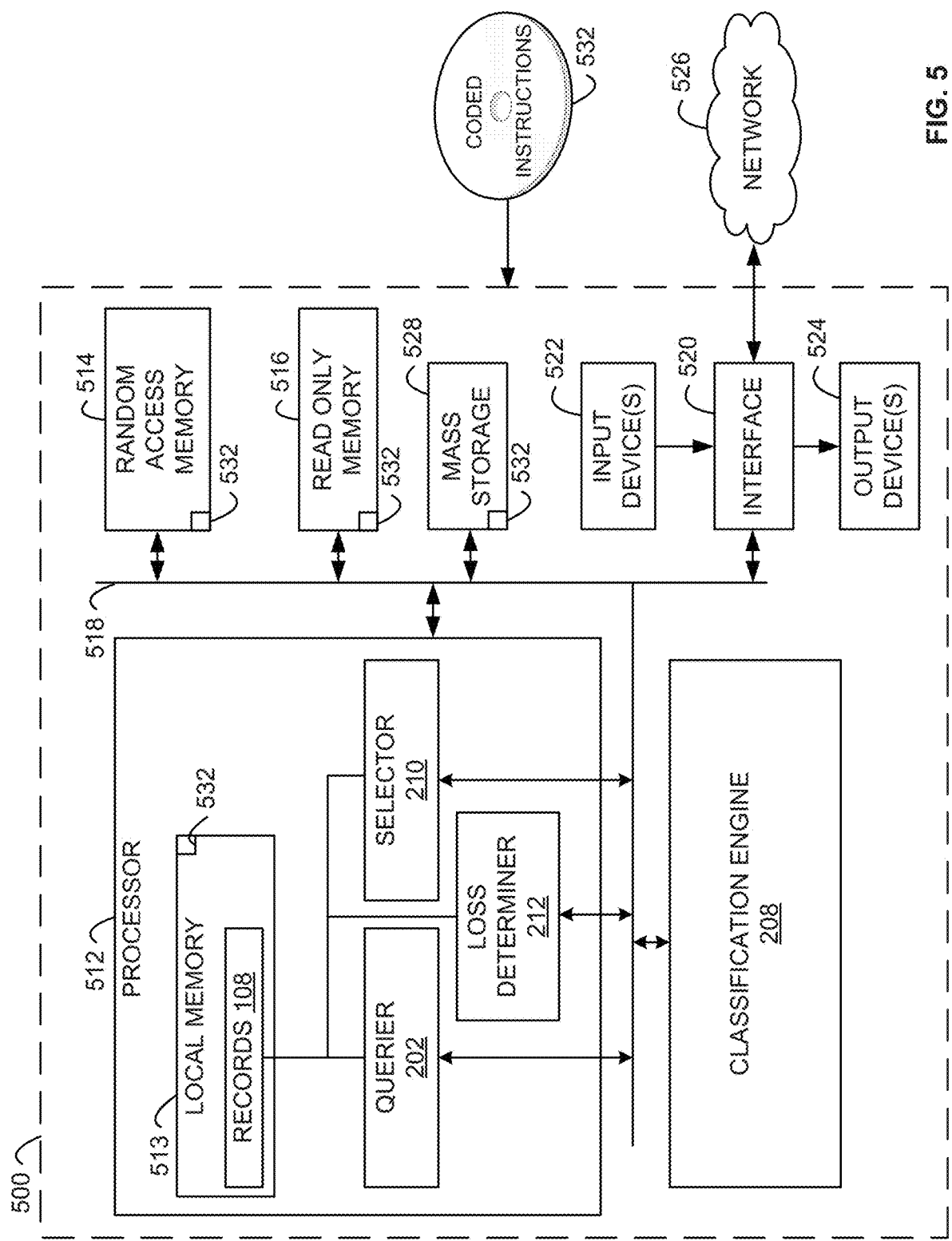
FIG. 5 illustrates an example processor system structured to execute the example instructions of FIG. 4 to implement the example classifier of FIGS. 1 and/or 2.

FIG. 5 is a block diagram of an example processor platform 500 configured to execute the process(es) of FIG. 5 to implement the classifier 116 of FIGS. 1 and 2. The processor platform 500 can be, for example, a server, a personal computer, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, or controllers from any desired family or manufacturer.

In the illustrated example, the processor 512 stores an example record 108, and implements the querier 202, the selector 210 and the loss determiner described above in connection with FIG. 2, and/or in the documents attachment hereto.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory (RAM) device. The non-volatile memory 316 may be implemented by flash memory and/or any other desired type of memory device. Access to the main memory 514, 516 is controlled by a memory controller.

In the illustrated example, any one or more of the local memory 513, the RAM 514, the read only memory 516, and/or a mass storage device 528 may store the example database 104.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 include the machine-readable instructions of FIG. 4 and may be stored in the mass storage device 528, in the volatile memory 514, in the non-volatile memory 516, and/or on a removable tangible computer readable storage medium such as a CD or DVD.

From the foregoing, it will be appreciated that methods, apparatus and articles of manufacture have been disclosed which enhance the operations of a computer to improve the correctness of and possibility to perform multi-level hierarchical classification. In some examples, computer operations can be made more efficient based on the above equations and techniques for performing multi-level hierarchical classification. That is, through the use of these processes, computers can operate more efficiently by relatively quickly performing multi-level hierarchical classification. Furthermore, example methods, apparatus, and/or articles of manufacture disclosed herein identify and overcome inaccuracies and inability in the prior art to perform multi-level hierarchical classification.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the transition term in a preamble of a claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. An apparatus to demographically classify an individual, the apparatus comprising:
    a neural network structured to have an input layer, a first output layer, a second output layer subsequent to the first output layer, a sorting output layer, and a plurality of neural network modules interposed between the input layer and the first output layer, respective ones of the neural network modules including corresponding groups of interconnected neural layers, each group of interconnected neural layers having at least one connection between a corresponding input layer of the group of interconnected neural layers and corresponding output layer of the group of interconnected neural layers, the neural network structured to:
        process inputs presented at the input layer to form first outputs at the first output layer, the inputs based on demographic information for the individual, the first outputs representing a plurality of first possible classifications of the individual according to a demographic classification system at a first hierarchical level;
        process the first outputs at the sorting output layer to determine softmax outputs and sorted outputs, the sorted outputs different from the softmax outputs, the sorting output layer to process the first outputs based on a softmax operation to determine the softmax outputs, the sorting output layer to sort the first outputs separate from processing with the softmax operation to form groups of the first outputs that are grouped based on a plurality of second possible classifications of the individual according to the demographic classification system at a second hierarchical level different from the first hierarchical level, each one of the first outputs to have a one-to-one correspondence with a corresponding one of the plurality of first possible classifications, each one of the groups of the first outputs to have a one-to-one correspondence with a corresponding one of the plurality of second possible classifications;
        process the groups of the first outputs to form second outputs at the second output layer, the second outputs representing possible combined classifications of the individual, the possible combined classifications corresponding to combinations of the plurality of first possible classifications and the plurality of second possible classifications; and a processor to execute computer readable instructions to:
 select one of the second outputs at the second output layer;
 associate with the individual a respective one of the first possible classifications and a respective one of the second possible classifications corresponding to a respective one of the possible combined classifications represented by the selected second output;
 compute a loss value based on a weighted combination of a first contribution determined from the softmax outputs of the sorting output layer of the neural network, a second contribution determined from the second outputs of the second output layer of the neural network, and a third contribution determined from coefficients of the neural network, the first contribution adjusted based on a first weight, the second contribution adjusted based on a second weight, and the third contribution adjusted based on a third weight; and
 update one or more of the coefficients of the neural network based on the loss value.

2. The apparatus as defined in claim 1, wherein the neural network is also structured to include:
 a combining output layer structured to select, from each of the groups of the first outputs, a first one of the first outputs of the group having a greatest value to form third outputs,
 wherein the second output layer is structured to convert the third outputs into probabilities to form the second outputs.

3. The apparatus as defined in claim 2, wherein the plurality of neural network modules is structured to process the inputs presented at the input layer to form the first outputs at the first output layer.

4. The apparatus as defined in claim 1, wherein the first contribution is based on a first cross-entropy of the softmax outputs and the second contribution is based on a second cross-entropy of the second outputs.

5. The apparatus as defined in claim 4, wherein the processor is to update the one or more of the coefficients using a stochastic descent algorithm.

6. The apparatus as defined in claim 1, wherein the processor is to:
 query a database to obtain the demographic information for the individual; and
 form the inputs based on contents of the demographic information.

7. The apparatus as defined in claim 6, wherein the processor is to record the one of the first possible classifications and the one of the second possible classifications in the database in conjunction with the individual.

8. The apparatus as defined in claim 6, wherein the demographic information includes a first value of a demographic characteristic associated with the individual, and the processor is to:
 convert the first value to second value representative of a range of values of the demographic characteristic, the range of values including the first value; and
 form a first one of the inputs based on the second value.

9. The apparatus as defined in claim 1, wherein the second possible classifications represent demographic categories of the individual.

10. The apparatus as defined in claim 9, wherein the first possible classifications represent demographic segments of the demographic categories.

11. A method of performing demographic classification of an individual, the method comprising:
 obtaining data representative of demographic characteristics of an individual;
 processing the data with a neural network to form first outputs at a first output layer of the neural network, the first outputs representing a plurality of first possible demographic classifications of the individual at a first hierarchical classification level, the neural network including an input layer, the first output layer, a second output layer subsequent to the first output layer, a sorting output layer, and a plurality of neural network modules interposed between the input layer and the first output layer, respective ones of the neural network modules including corresponding groups of interconnected neural layers, each group of interconnected neural layers having at least one connection between a corresponding input layer of the group of interconnected neural layers and corresponding output layer of the group of interconnected neural layers;
 processing the first outputs with the neural network to determine softmax outputs and sorted outputs at the sorting layer, the sorted outputs different from the softmax outputs, the sorting layer to process the first outputs based on a softmax operation to determine the softmax outputs, the sorting layer to sort the first outputs separate from processing with the softmax operation to form groups of the first outputs that are grouped based on a plurality of second possible demographic classifications of the individual at a second hierarchical classification level different from the first hierarchical classification level, each one of the first outputs to have a one-to-one correspondence with a corresponding one of the plurality of first possible demographic classifications, each one of the groups of the first outputs to have a one-to-one correspondence with a corresponding one of the plurality of second possible demographic classifications;
 processing the groups of the first outputs with the neural network to form second outputs at the second output layer of the neural network, the second outputs representing possible combined demographic classifications of the individual corresponding to combinations of the plurality of first possible demographic classifications and the plurality of second possible demographic classifications;
 computing a loss value based on a weighted combination of a first contribution determined from the softmax outputs of the sorting output layer of the neural network, a second contribution determined from the second outputs of the second output layer of the neural network, and a third contribution determined from coefficients of the neural network, the first contribution adjusted based on a first weight, the second contribution adjusted based on a second weight, and the third contribution adjusted based on a third weight; and
 updating one or more of the coefficients of the neural network based on the loss value.

12. The method as defined in claim 11, wherein the processing of the groups of the first outputs to form the second outputs includes:
 identifying, for each of the groups of the first outputs, a first one of the first outputs of the group having a greatest value to form third outputs; and
 converting the third outputs into probabilities to form the second outputs.

13. The method as defined in claim 11, wherein the second possible demographic classifications represent demographic categories of the individual.

14. The method as defined in claim 13, wherein the first possible demographic classifications represent demographic segments of the demographic categories.

15. The method as defined in claim 11, wherein the first contribution is based on a first cross-entropy of the softmax outputs and the second contribution is based on a second cross-entropy of the second outputs.

16. The method as defined in claim 15, wherein the updating of the one or more of the coefficients includes using a stochastic descent algorithm.

17. A tangible computer-readable storage medium comprising instructions that, when executed, cause a machine to at least:

obtain data representative of demographic characteristics of an individual;

process the data with a neural network to form first outputs at a first output layer of the neural network, the first outputs representing a plurality of first possible demographic classifications of the individual at a first hierarchical classification level, the neural network including an input layer, the first output layer, a second output layer subsequent to the first output layer, a sorting output layer, and a plurality of neural network modules interposed between the input layer and the first output layer, respective ones of the neural network modules including corresponding groups of interconnected neural layers, each group of interconnected neural layers having at least one connection between a corresponding input layer of the group of interconnected neural layers and corresponding output layer of the group of interconnected neural layers;

process the first outputs with the neural network to determine softmax outputs and sorted outputs at the sorting output layer, the sorted outputs different from the softmax outputs, the sorting output layer to process the first outputs based on a softmax operation to determine the softmax outputs, the sorting output layer to sort the first outputs separate from processing with the softmax operation to form groups of the first outputs that are grouped based on a plurality of second possible demographic classifications of the individual at a second hierarchical classification level different from the first hierarchical classification level, each one of the first outputs to have a one-to-one correspondence with a corresponding one of the plurality of first possible demographic classifications, each one of the groups of the first outputs to have a one-to-one correspondence with a corresponding one of the plurality of second possible demographic classifications;

process the groups of the first outputs with the neural network to form second outputs at the second output layer of the neural network, the second outputs representing possible combined demographic classifications of the individual corresponding to combinations of the plurality of first possible demographic classifications and the plurality of second possible demographic classifications;

compute a loss value based on a weighted combination of a first contribution determined from the softmax outputs of the sorting output layer of the neural network, a second contribution determined from the second outputs of the second output layer of the neural network, and a third contribution determined from coefficients of the neural network, the first contribution adjusted based on a first weight, the second contribution adjusted based on a second weight, and the third contribution adjusted based on a third weight; and update one or more of the coefficients of the neural network based on the loss value.

18. The tangible computer-readable storage medium as defined in claim 17, wherein the instructions, when executed, cause the machine to process the groups of the first outputs to form the second outputs by:

identifying, for each of groups of the first outputs, a first one of the first outputs of the group having a greatest value to form third outputs; and converting the third outputs into probabilities to form the second outputs.

19. The tangible computer-readable storage medium as defined in claim 17, wherein the first contribution is based on a first cross-entropy of the softmax outputs and the second contribution is based on a second cross-entropy of the second outputs.

* * * * *